(12) United States Patent
Pharris

(10) Patent No.: US 8,301,500 B2
(45) Date of Patent: Oct. 30, 2012

(54) GHOSTING PAYMENT ACCOUNT DATA IN A MOBILE TELEPHONE PAYMENT TRANSACTION SYSTEM

(75) Inventor: Jennifer Pharris, Tomball, TX (US)

(73) Assignee: Global 1 Enterprises, Houston, TX (US)

( * ) Notice: Subject to any disclaimer, the term of this patent is extended or adjusted under 35 U.S.C. 154(b) by 98 days.

(21) Appl. No.: 12/412,219

(22) Filed: Mar. 26, 2009

(65) Prior Publication Data

US 2009/0254440 A1    Oct. 8, 2009

Related U.S. Application Data

(60) Provisional application No. 61/041,723, filed on Apr. 2, 2008, provisional application No. 61/127,314, filed on May 12, 2008.

(51) Int. Cl.
*G06Q 10/00* (2012.01)
(52) U.S. Cl. .......................................................... 705/17
(58) Field of Classification Search .................... 705/40, 705/39, 17
See application file for complete search history.

(56) References Cited

U.S. PATENT DOCUMENTS

| | | | |
|---|---|---|---|
| 5,717,374 A | 2/1998 | Smith | |
| 5,991,749 A | 11/1999 | Morrill, Jr. | |
| 7,024,174 B2 | 4/2006 | Nagy et al. | |
| 7,099,850 B1 | 8/2006 | Mann et al. | |
| 7,657,489 B2 | 2/2010 | Stambaugh | |
| 7,865,414 B2 | 1/2011 | Fung et al. | |
| 8,052,042 B2 | 11/2011 | Kolinski-Schultz et al. | |
| 8,073,774 B2 | 12/2011 | Pousti | |
| 8,073,783 B2 | 12/2011 | Felsted et al. | |
| 2002/0042776 A1 | 4/2002 | Woo et al. | |
| 2002/0065774 A1 | 5/2002 | Young et al. | |
| 2002/0131404 A1 | 9/2002 | Mehta et al. | |
| 2002/0161708 A1 | 10/2002 | Offer | |
| 2003/0101137 A1 | 5/2003 | Wronski | |
| 2003/0195842 A1 | 10/2003 | Reece | |
| 2004/0248554 A1 | 12/2004 | Khan et al. | |
| 2005/0070265 A1 | 3/2005 | Korpinen | |
| 2005/0080697 A1 | 4/2005 | Foss et al. | |
| 2005/0187873 A1* | 8/2005 | Labrou et al. | 705/40 |
| 2005/0222961 A1 | 10/2005 | Staib et al. | |
| 2006/0000900 A1 | 1/2006 | Fernandes | |
| 2006/0136901 A1 | 6/2006 | Nichols | |
| 2006/0200427 A1 | 9/2006 | Morrison et al. | |
| 2006/0206709 A1 | 9/2006 | Labrou et al. | |
| 2006/0235796 A1 | 10/2006 | Johnson et al. | |

(Continued)

FOREIGN PATENT DOCUMENTS

DE        10119808        9/2002

(Continued)

OTHER PUBLICATIONS

PCT Search Report for PCT/US2009/039328, Dated Nov. 11, 2009.

(Continued)

*Primary Examiner* — Shay S Glass

(57) ABSTRACT

Techniques are disclosed for a mobile telephone, in conjunction with a payment transaction server, to be used directly as a payment device for a variety of financial transactions. Further, the transaction systems and methods for mobile telephone devices described herein allow a mobile telephone to participate in payment transactions in a manner that helps prevent identify theft and without relying on transferring amounts to/from one stored value account to another.

18 Claims, 10 Drawing Sheets

U.S. PATENT DOCUMENTS

| | | | |
|---|---|---|---|
| 2006/0265243 A1 | 11/2006 | Racho et al. |
| 2006/0278698 A1 | 12/2006 | Lovett |
| 2007/0022058 A1 | 1/2007 | Labrou et al. |
| 2007/0033285 A1 | 2/2007 | Shiigi et al. |
| 2007/0067642 A1 | 3/2007 | Singhal |
| 2007/0125838 A1 | 6/2007 | Law et al. |
| 2007/0125840 A1 | 6/2007 | Law et al. |
| 2007/0175978 A1 | 8/2007 | Stambaugh |
| 2007/0203850 A1 | 8/2007 | Singh et al. |
| 2007/0244811 A1 | 10/2007 | Tumminaro |
| 2008/0011825 A1 | 1/2008 | Giordano et al. |
| 2008/0017704 A1 | 1/2008 | VanDeburg et al. |
| 2008/0040285 A1 | 2/2008 | Wankmueller |
| 2008/0048022 A1 | 2/2008 | Vawter |
| 2008/0208743 A1 | 8/2008 | Arthur et al. |
| 2008/0208744 A1 | 8/2008 | Arthur et al. |
| 2008/0208762 A1 | 8/2008 | Arthur et al. |
| 2008/0210751 A1 | 9/2008 | Kim |
| 2008/0229410 A1 | 9/2008 | Felsted et al. |
| 2008/0249928 A1 | 10/2008 | Hill et al. |
| 2008/0255947 A1 | 10/2008 | Friedman |
| 2008/0275779 A1 | 11/2008 | Lakshminarayanan |
| 2009/0063312 A1 | 3/2009 | Hurst |
| 2009/0106148 A1 | 4/2009 | Prada |
| 2009/0108015 A1 | 4/2009 | Kreamer |
| 2009/0138366 A1 | 5/2009 | Bemmel et al. |
| 2009/0144161 A1 | 6/2009 | Fisher |
| 2009/0171845 A1 | 7/2009 | Powell |
| 2009/0200371 A1 | 8/2009 | Kean et al. |
| 2009/0222353 A1 | 9/2009 | Guest et al. |
| 2009/0248537 A1 | 10/2009 | Sarkeshik |
| 2009/0254479 A1 | 10/2009 | Pharris |
| 2009/0266884 A1 | 10/2009 | Killian et al. |
| 2009/0281904 A1 | 11/2009 | Pharris |
| 2010/0044430 A1 | 2/2010 | Song et al. |
| 2010/0057619 A1 | 3/2010 | Weller et al. |
| 2010/0063895 A1 | 3/2010 | Dominguez et al. |
| 2011/0313924 A1 | 12/2011 | Carell et al. |
| 2012/0047070 A1 | 2/2012 | Pharris |

FOREIGN PATENT DOCUMENTS

| | | | |
|---|---|---|---|
| JP | 2001297198 | | 10/2001 |
| JP | 2002-99716 | | 4/2002 |
| JP | 2007-317173 | | 12/2007 |
| KR | 10-2002-0065989 | | 8/2002 |
| KR | 10-2003-0068603 | | 8/2003 |
| KR | 2006-105372 | | 10/2006 |
| KR | 10-2007-0092400 | | 9/2007 |
| KR | 1020070092400 | * | 10/2007 |
| KR | 2008042374 | | 5/2008 |
| WO | 98/34203 | | 8/1998 |
| WO | 2005/079254 | | 9/2005 |
| WO | 2005/086593 | | 9/2005 |
| WO | 2007/145500 | | 12/2007 |
| WO | 2008/008735 | | 1/2008 |

OTHER PUBLICATIONS

PCT Search Report for PCT/US2009/039322, Dated Oct. 30, 2009.
PCT Search Report for PCT/US2009/039329, Dated Nov. 17, 2009.
Gateway, entry in Microsot Computer Dictionary, Fifth Edition, 2002.
Office Action issued in U.S. Appl. No. 12/412,235 dated Oct. 27, 2010, 11 pages.
Office Action issued in U.S. Appl. No. 12/412,235 dated Jun. 6, 2011, 20 pages.
Written Opinion issued in PCT/US2009/039329 dated Nov. 17, 2009, 4 pages.
International Preliminary Report on Patentability issued in PCT/US2009/039329 dated Oct. 5, 2010, 5 pages.
Office Action issued in Chinese Application No. 200980112279.X dated Jun. 10, 2011, 8 pages.
Extended EP Search Report issued in EP Application No. 09755473.7, dated Jan. 26, 2012, 8 pages.
Office Action issued in U.S. Appl. No. 12/412,193 dated Mar. 3, 2011, 24 pages.
Office Action issued in U.S. Appl. No. 12/412,193 dated Aug. 31, 2011, 26 pages.
Written Opinion for PCT/US2009/039322, dated Oct. 30, 2009, 4 pages.
International Preliminary Report on Patentability for PCT/US2009/039322, dated Oct. 5, 2010, 5 pages.
Extended European Search Report issued in EP Patent Application No. 09755468.7, Jan. 26, 2012, 7 pages.
Written Opinion issued in PCT/US2009/039328 dated Nov. 11, 2009, 4 pages.
International Preliminary Report on Patentability issued in PCT/US2009/039328 dated Oct. 5, 2010, 5 pages.
Extended European Search Report issued in EP Patent Application No. 09755472.9, Jan. 26, 2012, 6 pages.
Office Action issued in Chinese Application No. 200980112279.X dated Feb. 17, 2012, 7 pages.
Office Action issued in Korean Application No. 10-2010-7022087; Mar. 21, 2012; 4 pages.
Office Action issued in Korean Application No. 10-2010-7022089; Mar. 27, 2012; 3 pages.
Office Action issued in U.S. Appl. No. 12/969,667, dated Mar. 12, 2012, 23 pages.

* cited by examiner

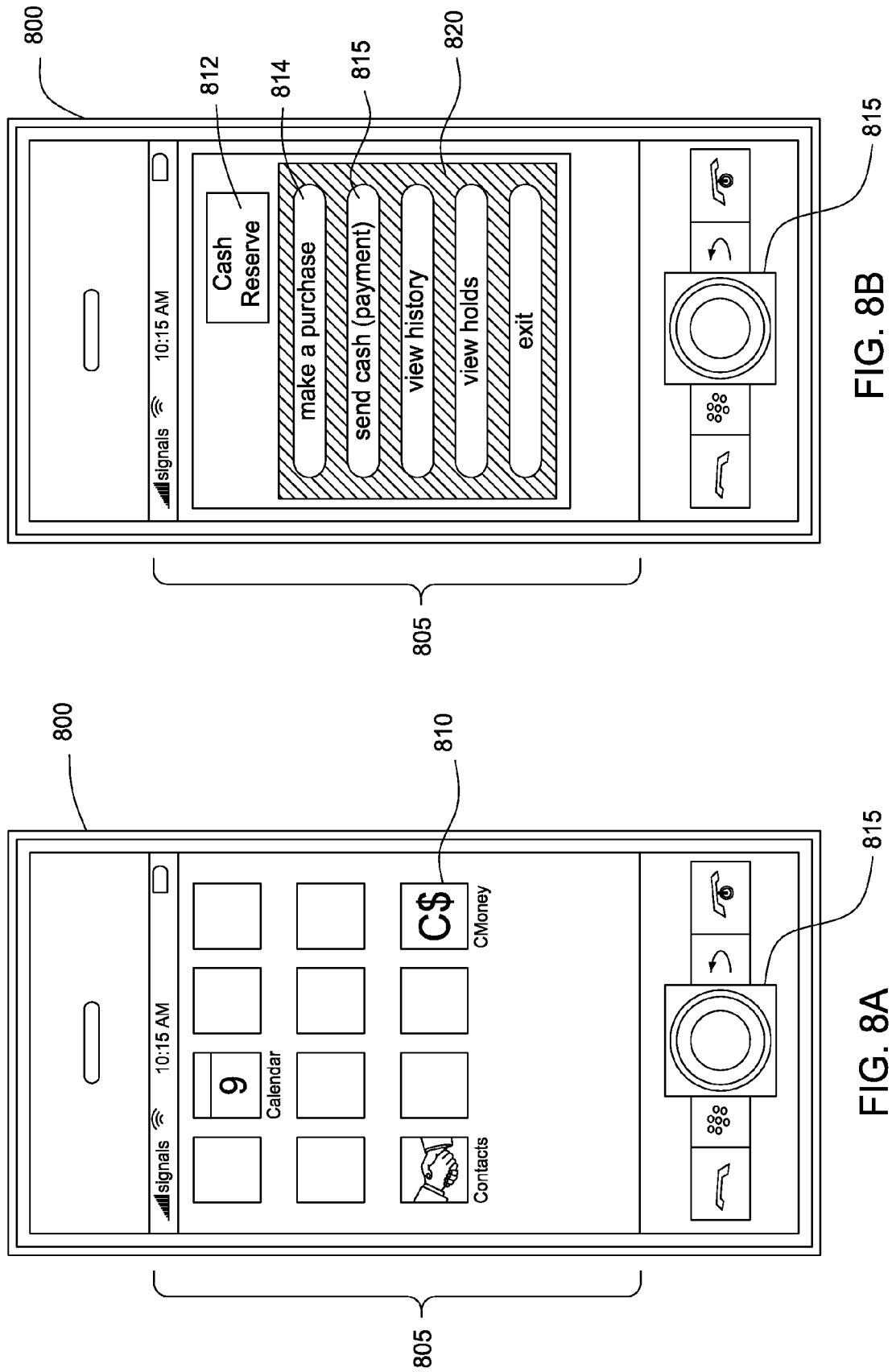

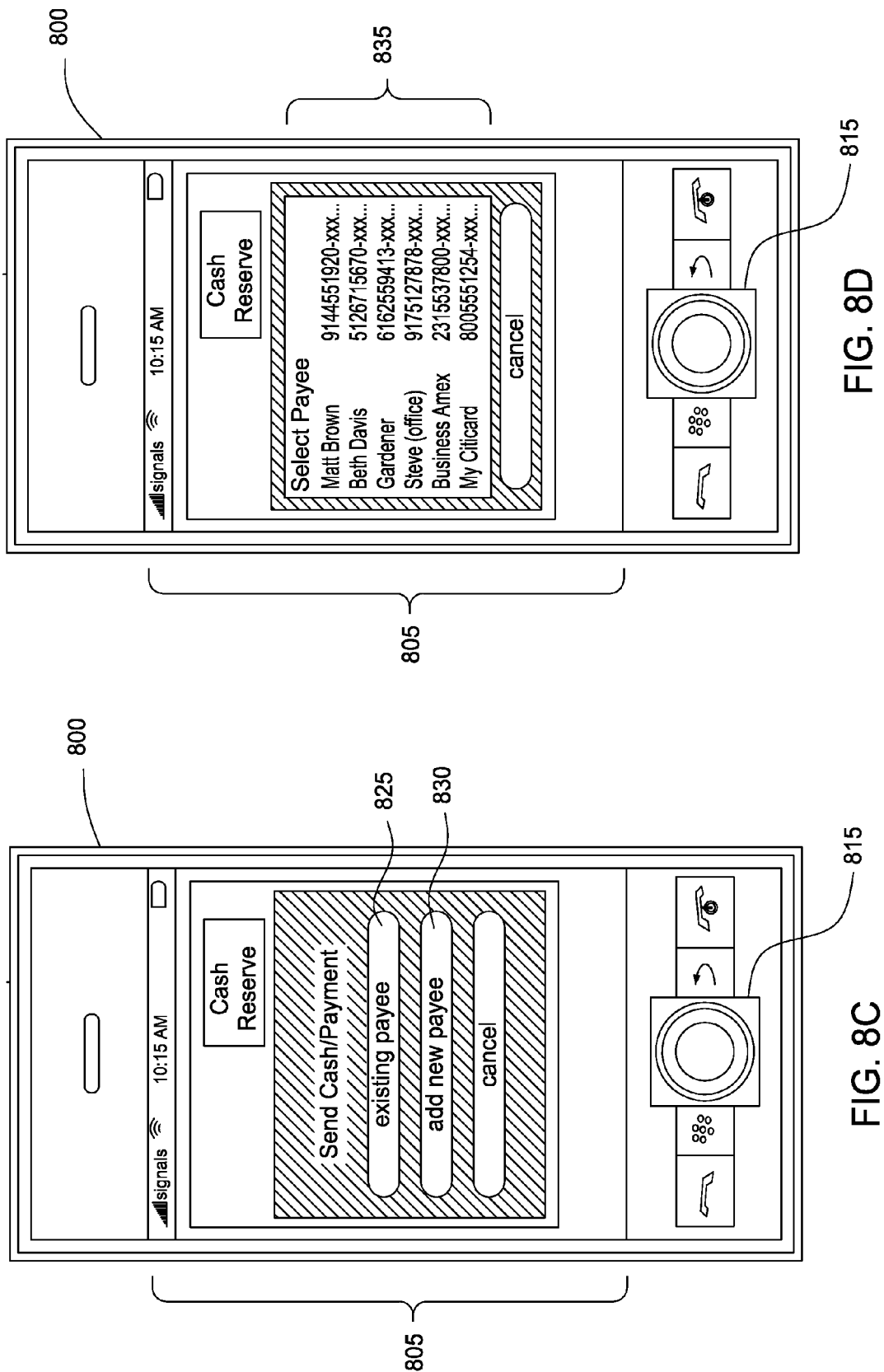

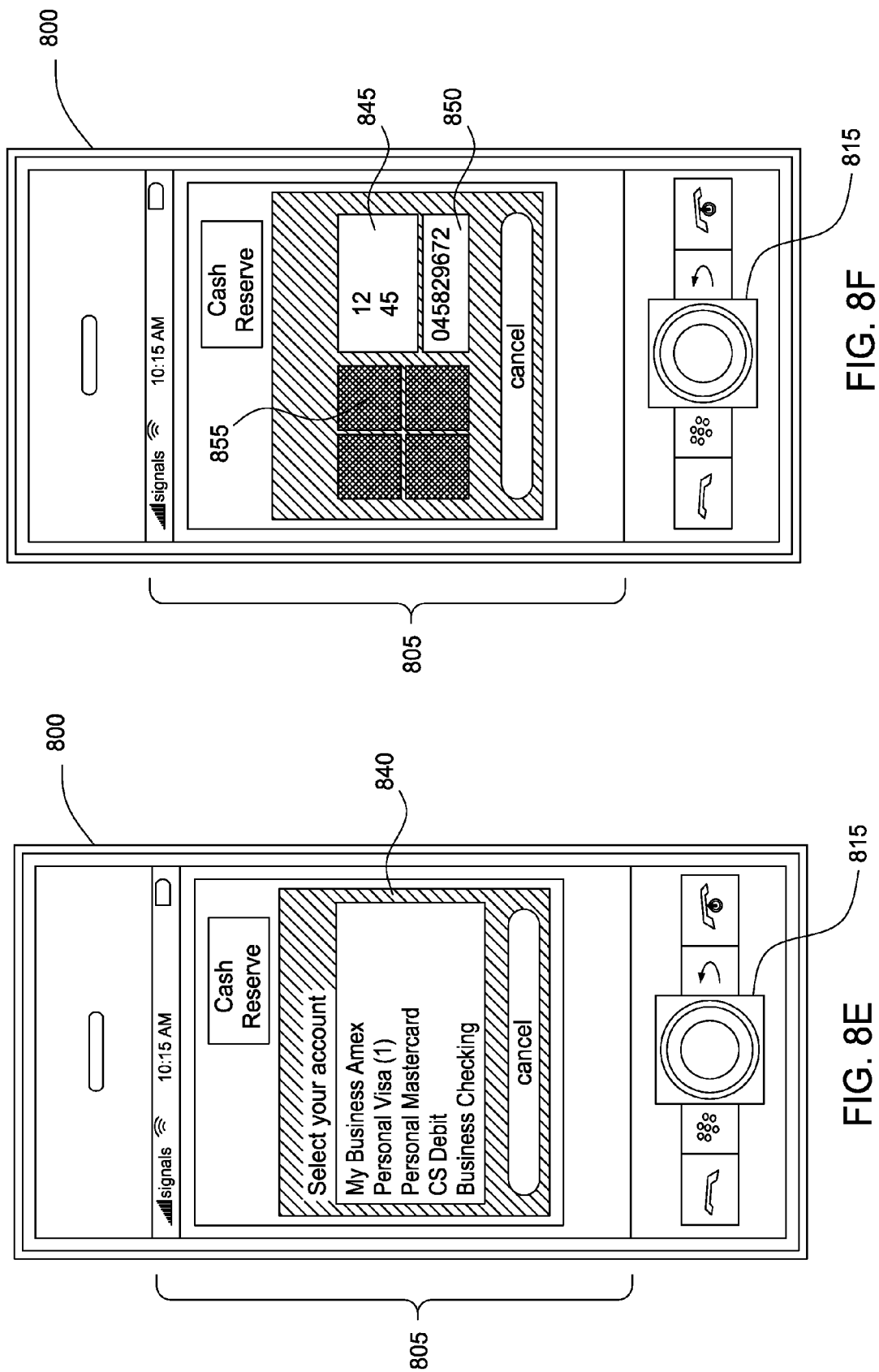

GHOSTING PAYMENT ACCOUNT DATA IN A MOBILE TELEPHONE PAYMENT TRANSACTION SYSTEM

CROSS-REFERENCE TO RELATED APPLICATIONS

This application claims benefit of U.S. Provisional Patent Application Ser. No. 61/041,723, filed Apr. 2, 2008. This application also claims benefit of U.S. Provisional Patent Application Ser. No. 61/127,314, filed on May 12, 2008. Both provisional applications are incorporated by reference herein in their entirety.

BACKGROUND OF THE INVENTION

1. Field of the Invention

Embodiments of the invention generally provide transaction systems and methods for mobile telephone devices. More specifically, embodiments of the invention allow a mobile telephone, in conjunction with a payment transaction server, to be directly used as a payment device for a variety of financial transactions.

2. Description of the Related Art

As is well known, individuals may establish an account with a bank and write checks drawn on their account to pay for goods and/or services. Similarly, credit and debit cards have replaced the use of cash (and checks) in a large percentage of commercial transactions. However, fraud, theft, and other misuse of checks and credit/debit accounts is a serious problem, costing both banks and consumers substantial sums of money. For example, identity theft has become a significant source of fraud, resulting in financial losses to both banks and individuals. Identify theft generally refers to the co-option of another person's personal information (e.g., name, social security number, bank or credit card account numbers, etc.) without that person's knowledge coupled with the fraudulent use of such information. For the individual involved, the effects of identity theft may reverberate well past an initial theft of information—costing time and resources for the affected individual to address. For the bank, identity theft typically results in unrecoverable losses. Thus, both banks and individuals have a strong incentive to keep account data secure. At the same time, the convenience and near-universal acceptance of credit/debit cards for payment transactions has resulted in extremely widespread adoption of these payment systems both in the United States and around the world.

Another well known payment technique allows individuals to transfer funds from one person to another (or to/from a business) using stored value accounts. For example, gift certificates or gift cards may be purchased and used to store a fixed value amount until used. Other stored value accounts allow individuals to transfer funds from one source (e.g., a charge to a credit card or an ACH debit to a bank account) to another—effectively creating a stored value account for the recipient. The recipient in turn, transfers amounts from the stored value account to an actual account—from which the funds are made available. However, stored value accounts provide consumers with little protection against fraud, theft, or other misuse. Few merchants, e.g., will replace a lost gift card and few mechanisms are used to deter the use of a stolen (or simply found) gift card. Further, stored value accounts may limit the use of funds transferred to the stored value account, e.g., a gift-card is typically good for a single (or limited number) of locations. Further still, stored value accounts are frequently operated in a manner to avoid banking regulation, and thus often operate in a largely unregulated (and uninsured) manner.

At the other end of the spectrum, a sizeable number of individuals do not even have a bank account, and thus, cannot participate in a variety of transactions, e.g., on-line purchases, credit/debit card transactions, etc. As of February 2009, for example, an estimated 28 million people in the United States do not have a bank account—often because of mistrust, cultural, or language barriers. Outside of the United States, the percentage of the "unbanked" is even higher in many countries.

At the same time, mobile telephone devices have become highly sophisticated. In addition to conventional telephone functionality, current mobile telephones provide a handheld computing platform capable of executing a variety of software applications as well as connecting to a data network. Mobile telephones frequently include a web-browser application which allows users to access web sites—some developed specifically for such devices. For example, many banks have developed customized web-sites allowing their customers to access data related to their account directly on a mobile phone. Such websites typically allow users to view balances, transfer funds between their accounts, schedule on-line payments, etc. Similarly, users can make purchases from online merchants by providing credit card information while browsing a website using a browser running on a mobile phone device. While having access to this information from a mobile phone is useful, it essentially provides the same functionality as on-line banking and e-commerce services accessed from a desktop computer. That is, while some users can access banking information and e-commerce websites from their mobile telephone, the mobile telephone device does not, in fact, participate in a payment transaction.

Some approaches have been tried to allow a mobile telephone device to participate in payment transactions directly. For example, radio frequency ID (RFID) tags have been used to allow a mobile phone to be waived in front of a reader and have amounts deducted from a stored value account associated with the telephone or have amounts charged to a credit card account associated with the mobile telephone. However, such approaches turn the phone itself into a target for potential identity theft, fraud or other misuse, as identifying information and account numbers are stored on the mobile phone and subject to misuse when a mobile telephone is lost or stolen. Thus, current approaches for allowing a mobile phone to participate in payment transactions systems have not experienced widespread adoption—despite the overwhelmingly worldwide adoption of mobile phones generally.

SUMMARY OF THE INVENTION

One embodiment of the invention provides a computer implemented method for using a mobile telephone as a payment device. The method may generally include receiving a request to enroll a mobile telephone in a payment transaction system. The request includes an indication of an identity of an individual enrolling the mobile telephone and the telephone number of the mobile telephone. The method may also include receiving one or more account numbers from the individual. Each account number corresponds to a payment account previously established by the individual. The method may further include generating a ghosted account name for each of the payment accounts; and transmitting each ghosted account name to a payment application executing on the mobile phone. The payment application, when executed on the mobile telephone, allows the individual to initiate a payment transaction using the mobile telephone as the payment device in order to incur a charge on a selected one of the payment accounts without revealing the account number associated with the selected payment account.

Still another embodiment of the invention includes a computer-readable storage medium containing a program, which, when executed on a processor performs an operation for using a mobile telephone as a payment device. The operation may generally include receiving a request to enroll a mobile telephone in a payment transaction system. The request itself may include an indication of an identity of an individual enrolling the mobile telephone and the telephone number of the mobile telephone. The operation may further include receiving one or more account numbers from the individual. Each account number corresponds to a payment account previously established by the individual. The operation may also include generating a ghosted account name for each of the payment accounts and transmitting each ghosted account name to a payment application executing on the mobile phone. The payment application, when executed on the mobile telephone, allows the individual to initiate a payment transaction using the mobile telephone as the payment device in order to incur a charge on a selected one of the payment accounts without revealing the account number associated with the selected payment account.

Still another embodiment of the invention includes a system, comprising having a processor and a memory containing a transaction server, which when executed by the processor performs an operation for using a mobile telephone as a payment device. The operation may generally include receiving a request to enroll a mobile telephone in a payment transaction system. The request itself may include an indication of an identity of an individual enrolling the mobile telephone and the telephone number of the mobile telephone. The operation may further include receiving one or more account numbers from the individual. Each account number corresponds to a payment account previously established by the individual. The operation may also include generating a ghosted account name for each of the payment accounts and transmitting each ghosted account name to a payment application executing on the mobile phone. The payment application, when executed on the mobile telephone, allows the individual to initiate a payment transaction using the mobile telephone as the payment device in order to incur a charge on a selected one of the payment accounts without revealing the account number associated with the selected payment account.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 8A-8F are examples of graphical user interfaces displays on a mobile telephone device configured to participate in payment transactions, according to one embodiment of the invention.

DETAILED DESCRIPTION OF THE PREFERRED EMBODIMENTS

Figure 1:
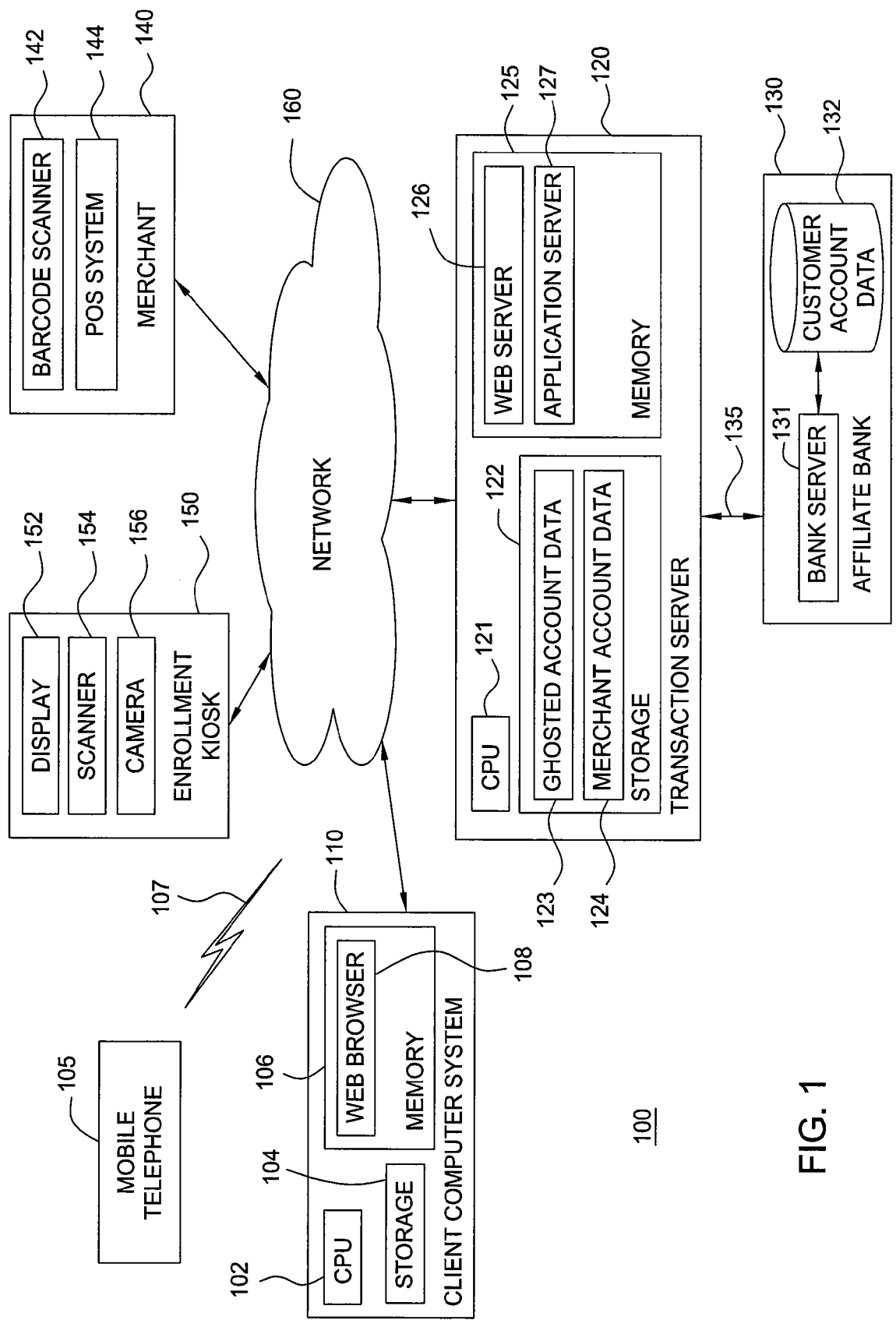
FIG. 1 is a block diagram illustrating a mobile telephone transaction system, according to one embodiment of the invention.

Embodiments of the invention generally provide transaction systems and methods for mobile telephone devices. For example, embodiments of the invention allow a mobile telephone, in conjunction with a payment transaction server, to be used directly as a payment device for a variety of financial transactions. Further, the transaction systems and methods for mobile telephone devices described herein allow a mobile telephone to participate in payment transactions in a manner that both prevents identify theft and does not rely on transferring amounts to/from one stored value account to another.

In one embodiment, an individual enrolls their mobile telephone in the payment transaction system by providing a cell phone number, along with information as needed to identify that individual and to comply with "know-your-customer" laws, or other regulations. In a particular embodiment, the enrollment process may be kiosk-driven, where the user interacts with a kiosk to provide information regarding their cell phone (e.g., a cell phone number) and identifying information (e.g., a drivers' license, passport, or other government issued identification number). The kiosk itself may include a computer system connected over a computer network to the payment transaction server.

The transaction server may vet the enrollment information provided by the user as needed to ensure (i) that the individual is, in fact, who they represent themselves to be and (ii) that a service provider for the mobile phone being enrolled has an account for the phone that is associated with the individual.

Once the information is vetted by the payment transaction server, a bank account may be opened for the user. In one embodiment, the entity operating the transaction server may itself be a bank. In such a case, the account may be opened for the enrolling individual at that bank. Alternatively, the entity providing the payment transaction server may have a bank affiliate. In such a case, the transaction server may provide the appropriate information to a computer system operated by the affiliate bank to establish an account for the individual and mobile telephone being enrolled. In any event, the user may receive interest on amounts deposited in the bank account, and the account generally function as a typical insured, regulated account (e.g., in the United States, bank accounts are insured for amounts up to $250,000 by the Federal Deposit Insurance Corporation (FDIC)). However, the account is tied directly to the mobile telephone being enrolled in the payment transaction system. That is the mobile telephone becomes a gateway for moving funds into or out of the various bank accounts associated with the mobile telephone and its authorized account holder.

Further, in one embodiment, the customer may be a bank with a merchant account and a designated mobile telephone number. In such a case, the bank may designate subaccounts for other customers using embodiments of the invention to make payments or transfers to a bank related transaction.

Additionally as part of the enrollment process, the user may provide any number of credit/debit card accounts, store-specific credit card accounts, and other bank accounts to associate with the mobile telephone device and the payment transaction system. Once provided, such account numbers are stored securely by the payment transaction server, and not on the user's mobile phone. Instead, the accounts are "ghosted," on the mobile telephone. That is, each account enrolled with the payment transaction system is represented on the mobile telephone and the transaction server using an alias or "ghosted" name. For example, software running on the mobile telephone may retrieve the last four digits of each account number from the transaction server as part of the enrollment process. Once retrieved, the user may provide a preferred "ghosted" name for each account (or simply stick with the default). Thereafter, when the user wishes to initiate a payment transaction, the user may select one of the accounts to use as the actual source of funds, e.g., a credit/debit card account. Of course, if funds are available in the account specifically tied to the mobile phone, that account may be used to complete a payment transaction as well. By abstracting the user's actual payment account data (e.g., credit/debit card numbers, other bank account numbers, etc.) using the ghosting process, embodiments of the invention greatly reduce the potential for identify theft for users of the mobile phone transaction system described herein.

In one embodiment, the enrolling user may download (or otherwise have) software installed on their mobile telephone. As described in greater detail herein, the software may be used to access the accounts tied to the mobile telephone, e.g., to view balances in that account, to transfer funds, or to allow the mobile telephone to engage in a payment transaction directly. For example, the software on the mobile telephone may be used to transfer funds to another mobile telephone enrolled in the payment transaction system. In such a case, the sender may designate one of the multiple bank accounts from which the transfer should be drawn (or designate the account established for the mobile phone during the enrollment process), and in response funds are moved from the account designated by the sender to another mobile telephone user and deposited to one an account of the recipient. To access such funds, the receiving user may interact with the software running on their mobile telephone to move the funds from the account associated with the mobile phone to another (e.g., to another bank account) or to authorize an ATM (or bank teller) to convert the funds to actual currency.

As another example, the software may be used to generate barcodes, pay codes, or other visual or textual data used by a merchant to complete in a payment transaction. For example, the individual may interact with their mobile phone to initiate a payment transaction and to select a source of funds for the transaction (e.g., the user may select a ghosted credit card account or one of the various accounts tied directly to the mobile phone). In response, the software may generate a barcode used to uniquely identify that transaction. The merchant than uses a device to read the barcode and recover the information identifying the transaction. A computer system at the merchant then contacts the payment transaction server with the barcode and a payment amount. If an external account was selected as the source of payment (e.g., a credit card), then the transaction server attempts to charge the selected account. If the charge is approved, funds are transferred to the merchant's account and a message indicating such is provided to the merchant. If the account tied to the mobile telephone is selected, then, provided funds are available in that designated account, the transaction is approved and a message indicating such is provided to the merchant.

Similarly, a pay code may be generated to complete an on-line purchase. A pay code may provide an alpha-numeric text string entered in place of an actual account number when engaging in payment transaction with an online merchant. The on-line merchant processes the pay code in a manner similar to that described above for a merchant to process a bar code.

In a particular embodiment, the barcode (or pay code) may be valid for a limited period of time—and good for only a single transaction between a specified merchant and the user of the mobile telephone device. Further, to initiate a transaction at all, the user of the mobile phone may be required to enter a pin number or password before the software will generate a requested barcode. Thus, the payment transaction system provides two-factor security—"something you know" (i.e., the pin/password) and "something you have" (i.e., the mobile telephone). Further, because the barcode encodes the identification associated with the ghosted account and transaction identifier, the actual account numbers associated with the transaction are not at risk of being comprised.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a mobile telephone transaction payment system 100, according to one embodiment of the invention. As shown, the payment system 100 includes a mobile phone 105, a client computer system 110, a transaction server 120, an affiliate bank 130, a participating merchant 140, or participating financial institution (i.e., a depository bank), and an enrollment kiosk 150—each configured to communicate over a network 160. As described above, the transaction server 120 allows the mobile telephone 105 to be used directly as a payment device for a variety of financial transactions. For example, the mobile phone may be used as a payment device with the merchant 140.

Prior to being used as a payment device, however, the mobile phone 105 is enrolled in the payment system 100 as a participating device. For example, an individual may interact with enrollment kiosk 150 to enroll their mobile phone in the payment system 100. Illustratively, the enrollment kiosk 150 includes a display 152, a scanner 154, and a camera 156. The display 152 provides an output screen presenting an enrolling user with the current status of the enrollment process. Display 152 may be an interactive, touch sensitive display and the enrollment kiosk 150 may include a keyboard or other input/output devices, allowing the enrolling user to supply the appropriate information to enroll their mobile phone 105 in the payment system 100. Scanner 154 may allow the user to scan both identification cards (e.g., a driver's license) as well as scan credit/debit cards to associate with the mobile telephone 105 as a ghosted account. Camera 156 may be used to capture an image of the individual enrolling a given mobile phone 105 in the payment system 100.

In one embodiment, the transaction server 120 facilitates the process of enrolling the mobile phone 105 as well as manages transactions initiated using the mobile phone 105 as a payment device. As shown, the transaction server 120 provides a computing system which includes a CPU 121, storage 122 and memory 125. CPU 164 is included to be representative of a single CPU, multiple CPUs, a single CPU having multiple processing cores, and the like. Storage 122 stores application programs and data for use by the transaction server 120. Examples of storage 122 include one or more hard-disk drives, flash memory devices, optical media and the like. The transaction server 120 may be connected to the network 160 (e.g., a local area network, which itself may be connected to other networks such as the internet).

Memory 125 can be one or a combination of memory devices, including random access memory, nonvolatile or backup memory (e.g., programmable or flash memories, read-only memories, etc.). Additionally, the transaction server 120 may include input/output devices such as a mouse, keyboard and monitor, as well as a network interface used to connect to network 160. Illustratively, the memory 125 includes a web server 126 and an application server 127. As is known, web server 126 may receive to requests for access to electronic resources residing on the transaction server 120 (e.g., HTML documents, network information, as well as receive requests passed to application server 127). However, one of ordinary skill in the art will recognize that the web server 126 is merely illustrative and embodiments of the invention may be adapted to support both known and unknown protocols.

Additionally, as described in greater detail below, application server 127 may be configured to process requests related to enrolling mobile phone 105 in the payment transaction payment system 100 as well as requests to use an enrolled mobile phone as a payment device in a variety of payment transactions. Generally, in response to a given request, the application server 127 generates a response transmitted to (and rendered for display on) the mobile telephone 105. For example, the application server 127 may generate the appropriate WAP markup document, and pass it to the web server 126. In turn, the web-server 126 transmits the WAP markup document to the mobile telephone 105 (e.g., over a cellular network 107).

As part of the enrollment process, once a user supplies their mobile telephone number and identification information, the enrollment kiosk 150 may communicate this information to the transaction server 120 over network 160. In response, the transaction server 120 validates the information and verifies that the mobile phone number is, in fact, associated with the individual enrolling that phone in the payment system 100. For example, the enrollment kiosk 150 may communicate with the transaction server 120 to verify that the International Mobile Equipment Identity (IMEI) number associated with the mobile phone being enrolled is associated with the telephone number provided by the individual. The transaction server 120 may also verify the named individual being enrolled has an account for that mobile telephone with a service provider—and that the name on the mobile telephone account matches the name in the identification (e.g., a scanned drivers license or passport) provided by the enrolling individual.

Provided the data supplied by the enrolling user is successfully validated, the transaction server 120 may communicate with an affiliate bank, e.g., over a secure data link 135. The secure data link 135 may provide a dedicated, secure communications channel for the entity providing the payment transaction service to communicate with the affiliate bank 130. In response, the affiliate bank 130 establishes a bank account tied directly to the mobile phone 105. For example, the account number for the bank account may be a combination of the user's mobile phone number and a 10 digit bank account number assigned by the affiliate bank as follows:

(XXX-XXX-XXXX-XXXXXXXXXX)

{mobile phone number} + {Account number}

Once established, the user may interact with the mobile phone 105 to transfer money to the account with the affiliate bank—as well as use the mobile phone 105 directly to initiate payment transactions with merchants 140 using either funds from the account or using one of the ghosted accounts. In other words, by binding the user's mobile telephone number to the bank account opened during the enrollment process, the mobile phone 105 itself may be used in a variety of payment transactions directly.

For example, a software application installed on the mobile phone 105 may generate a barcode (or pay code) presented to the merchant 140 as payment for goods/services. Thus, as shown, merchant 140 includes a barcode scanner 142 used to read a barcode displayed on mobile phone 105. Alternatively, a pay code (e.g., an alpha-numeric text string) may be keyed into point-of-sale (POS) system 144 by a clerk at merchant 140. In any case, the payment information presented on the mobile phone 105 is captured by the barcode scanner 142 (or POS system 144) and transmitted in a message to the transaction server 120, along with a payment amount, to authorize a given transaction. Merchant account data 124 stored on transaction server 120 may include data related to participating merchants (e.g., merchant 140).

Illustratively, the affiliate bank 130 is shown to include a bank server 131 and a customer account database 132. Customer account database 132 generally includes customer account information, e.g., account numbers and account balances. As stated, the accounts may be tied directly to a given mobile phone 105, e.g., the phone number of an enrolled mobile phone may be incorporated into the bank account number. The bank server 131 may provide a computing system (e.g., a CPU, processor, and a memory) with application software configured to receive messages from the transaction server 120. For example, the bank server 131 may process messages to create a new account for a mobile telephone 105; messages to obtain a current balance of the account for an enrolled mobile phone 105; messages that the phone has initiated a payment transaction; messages to transfer funds from one participating mobile phone to another; messages to transfer funds to a merchant, messages to transfer funds to the account etc.

In one embodiment, as part of the enrollment process, the user may provide any number of credit/debit card accounts, store-specific credit card accounts, and other bank accounts using the scanner 154 (or may manually key in the account numbers and account types) at enrollment kiosk 150. Each such account is subsequently presented on the mobile telephone 105 as a ghosted account. Importantly, the actual account numbers are stored securely on the transaction server 120 and not on the mobile telephone 105 (shown in FIG. 1 as ghosted account data 123 in storage 122).

FIG. 1 also shows a client computer system 110 including a CPU 102, storage 104 and a memory 106. As shown, the memory 106 includes a web-browser 108. In one embodiment, the user of an enrolled mobile phone 105 may obtain information about their account using the web browser 108. For example, a user may request to see the current balance in the account tied to their mobile phone, review transactions performed with their mobile phone as a payment device, including transactions funded using ghosted accounts, and the like. Further, a user may define a user-profile specifying rules for moving funds into (or out of) the account associated with their mobile phone. For example, a user may desire to always have a minimum amount of funds in their account, or may limit the amount of funds to store in their mobile-phone account to a specified maximum.

Figure 2:
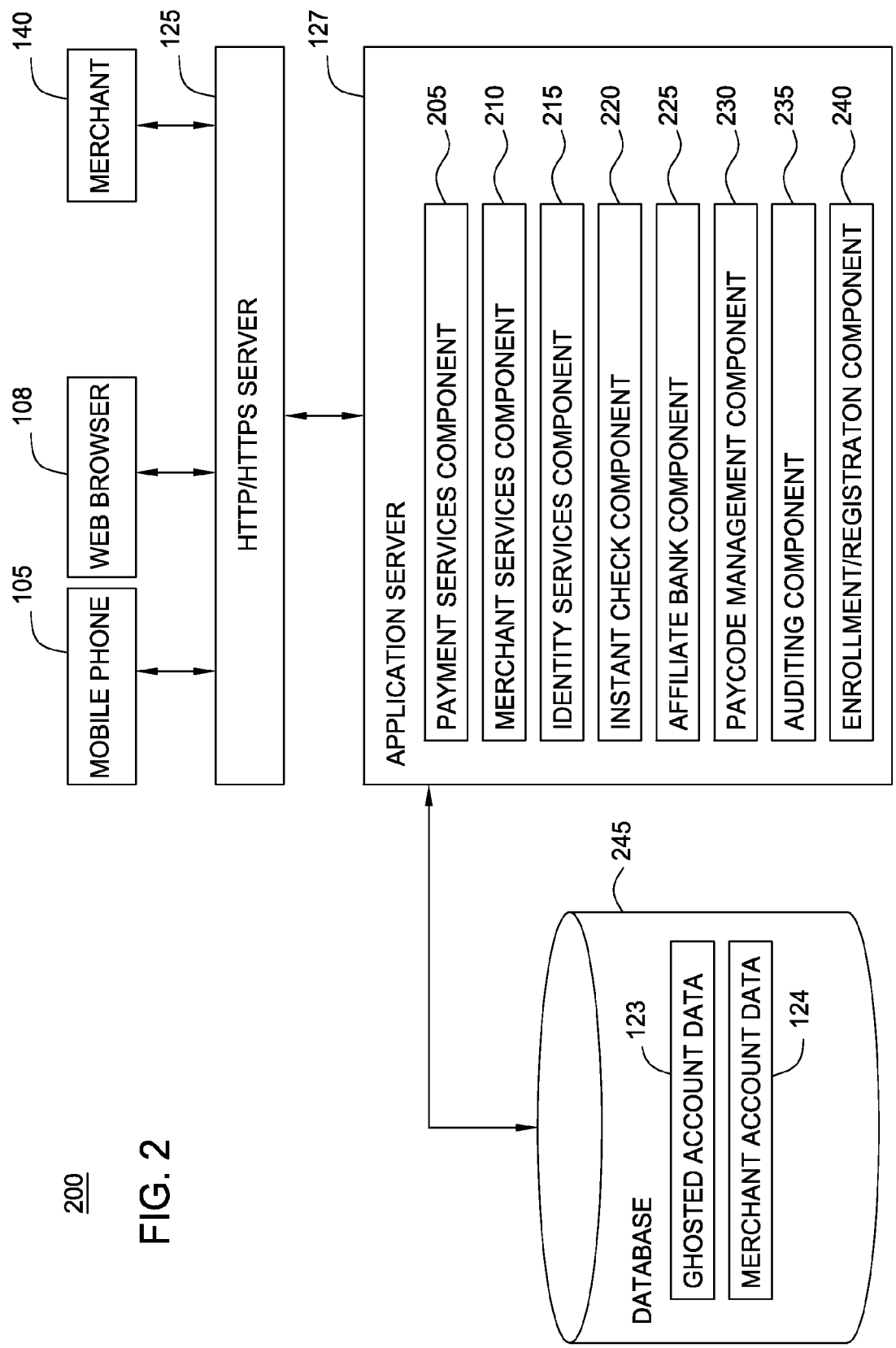
FIG. 2 is a block diagram further illustrating a transaction server configured to allow a mobile telephone to participate in a payment transaction, according to one embodiment of the invention.

FIG. 2 is a block diagram further illustrating a transaction server 120 configured to allow a mobile telephone to participate in a payment transaction, according to one embodiment of the invention. As noted above, the transaction server 120 may be a computer system configured with an application server 127 configured to manage the use of mobile phones as payment devices in the mobile telephone transaction payment system 100. As shown, an HTTP/HTTPS server may be used to broker communications between the application server 127 and the mobile phone 105, web-browser 108, and merchant 140. As show, the application server 127 includes a plurality of components, each providing a software module configured to facilitate the use of mobile phone 105 in payment transactions. Of course, one of ordinary skill in the art will recognize that the components 205-240 are shown as individual components to facilitate a description of the invention and that a variety of different software architectures may be used to implement the functionality of the components 205-240.

Illustratively, the application server includes a payment services component 205, a merchant services component 210, an identity services component 215, an instant check component 220, an affiliate bank communications component 225, a paycode/barcode management component 230, an auditing component 235, and an enrollment registration component 240. The payment services component 205 may be configured to manage transactions to transfer funds from one enrolled mobile phone to another. That is, from a bank account tied to a first mobile phone 105 to a bank account tied to another mobile phone 205. Some of the functions performed by the payment services component are described in greater detail below in conjunction with a description of FIG. 5.

The merchant services component 210 may be configured to manage transactions between an enrolled mobile phone and a merchant. That is, the merchant services component 210 manages transactions where an enrolled mobile phone is used directly as a payment device at a participating merchant, e.g., using a barcode or a pay code. Data related to a particular participating merchant may be stored as merchant account data in database 245. Some of the functions performed by the merchant services component 210 are described in greater detail below in conjunction with a description of FIG. 6.

The identity services component 215 may be used to store the identification information used to enroll a given user in the mobile telephone transaction payment system 100. For example, the identification number of a driver's license or passport as well as biometric data such as a camera or fingerprint scan obtained during the enrollment process at an enrollment kiosk. Further, the identify service component 215 may store passwords (or hashes of same), pin numbers, encryption keys, or other information used to authenticate a given transaction requested initiated by an enrolled mobile phone.

The instant check component 220 may be configured to manage transactions between an enrolled mobile phone and a non-enrolled mobile phone or third party bank. For example, in one embodiment, when a user attempts to send funds to a mobile phone not enrolled in the mobile telephone transaction payment system 100, the instant check component 220 may send a message to the non-enrolled mobile phone (e.g., using an SMS message) requesting that the recipient enroll their phone in the payment transaction payment system 100 in order to receive funds transferred from the enrolled mobile phone. Alternatively, the recipient may supply address information for a paper check to be mailed. Similarly, instant check component 220 may be configured to transfer funds from the account tied to a particular mobile phone at the affiliate bank to an account at a third party bank (e.g., using an ACH debit). The receiving bank may deposit the funds in an account held by the recipient at the third party bank. Some of the functions performed by the instant check component 220 are described in greater detail below in conjunction with a description of FIG. 7.

The affiliate bank component 225 may provide a software component be configured to communicate with the affiliate bank. That is, as payment requests are received from an enrolled mobile phone (for transfer to another mobile phone or to a merchant), the affiliate bank component 225 verifies the requested funds are available in the account associated with the sending mobile phone, as well as initiate transfers from that account to others. Thus, the affiliate bank component 225 may provide services to other components (e.g., the payment services component 205, merchant services component 210, and instant check component 220).

The pay code management component 230 may be configured to generate unique information used in a given transaction initiated by an enrolled mobile phone. For example, the pay code management component 230 may generate a barcode assigned to a given transaction and send this information (in an encrypted message) to a requesting mobile phone. The merchant then scans the barcode and communicates with the merchant services component 210 to compete a requested payment transaction. Once received, the merchant services component 210 may communicate with the pay code management component 230 to identify the transaction (and ultimately, the account at the particular bank or ghosted account) being used to fund a transaction. Thus, the pay code management component 230 may provide services to other components of the application server 127.

The auditing component 235 may be configured to create and manage a log of both the actions of the other components of the application server 127, as well as record a log of each transaction initiated, completed, or interrupted by an enrolled mobile phone or participating merchant. The log may be stored in database 245.

The enrollment registration component 240 may provide a software component configured to manage the process of enrolling a given mobile phone in the mobile telephone transaction payment system 100. Thus, the enrollment registration component 240 may communicate with an enrollment kiosk to receive and validate enrollment data and interact with the affiliate bank component 225 to create a bank account to bind to a given mobile phone being enrolled. For example, as described above, the affiliate bank may establish a bank account for the mobile phone being enrolled and use the actual phone number of that mobile phone as part of the account number with the affiliate bank. Additionally, the enrollment registration component 240 may receive account numbers for credit/debit card accounts and store this information as part of ghosted account data 123 in database 245. Some of the functions performed by the enrollment registration component 240 are described in greater detail below in conjunction with a description of FIG. 4.

Figure 3:
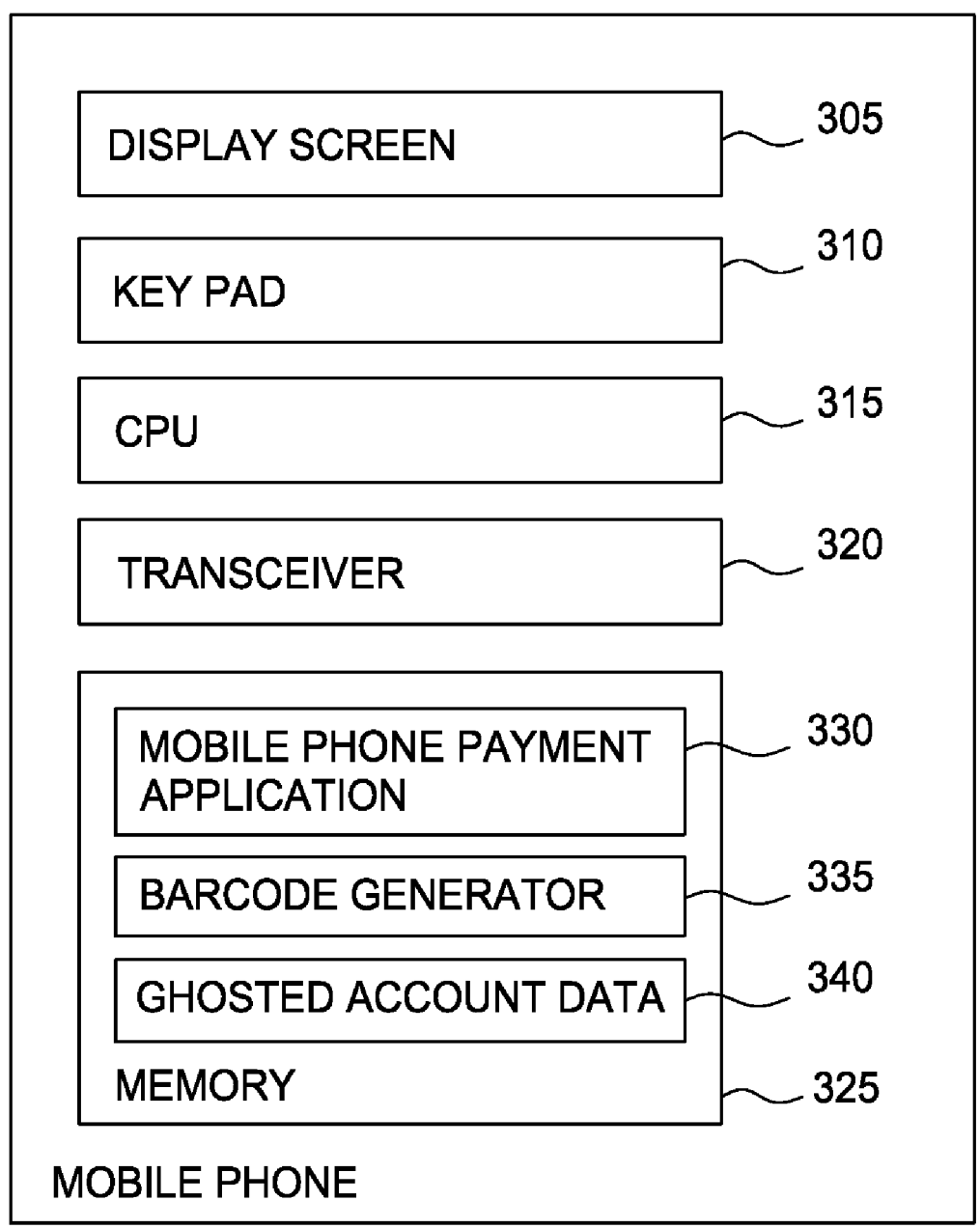
FIG. 3 is a block diagram further illustrating components of a mobile telephone configured to engage in payment transactions, according to one embodiment of the invention.

FIG. 3 is a block diagram further illustrating components of a mobile phone 105 configured to engage in payment transactions, according to one embodiment of the invention. As shown, the mobile telephone 105 includes a display screen 305, a keypad 310, a CPU 315, a transceiver 320, and a memory 325. The display screen 305 generally provide a graphical display device such as an color LCD screen. The display screen 305 may provide a touch sensitive interface used to present a virtual keyboard. Alternatively, (or additionally) the mobile phone 105 may include a keypad 310 including a number pad with a buttons for 0-9 or a full QWERTY keyboard. CPU 315 provides a processor used to execute a mobile phone payment application 330, as well as perform other tasks on mobile phone 105 (namely, sending and receiving text messages and running other application programs stored in the memory 325. Transceiver 320 provides a radio communication device allowing the mobile phone to send and receive voice and data transmissions over a cellular communication network (e.g., a CDMA or GSM network). Note, in one embodiment, in addition to the cellular communication network, mobile phone 105 may include a transceiver used to communicate over a wireless data communication network (e.g., an 802.11 network). Of course, embodiments of the invention may be adapted for use with these currently used voice and data communications protocols as well as other protocols subsequently developed.

Illustratively, the memory 325 on the mobile phone may include a mobile phone payment application 330, a barcode generator 335 and ghosted account data 340. In one embodiment, mobile phone payment application 330 may be used to initiate a payment transaction using the mobile phone as the payment device. Once initiated, the mobile phone payment application 330 may communicate with the transaction server 120 to request a payment code (e.g., a barcode and/or a pay code). In response, the transaction server 120 may then generate a barcode unique to a given transaction and transmit it to the mobile phone 105. The mobile phone payment application 330 receives data from the transaction server 120 and supplies it to the barcode generator 335.

In one embodiment, the barcode generator 335 may generate a display from the data received from the transaction server and display it on display screen 305. For example, the transaction server 120 may generate an encoding of a 2-D barcode, encrypt it, and transmit it to the payment application 330 on the mobile phone 105. In turn, the barcode generator 335 may decrypt the message from the transaction server 120, recover the encoded data, and generate a scannable display of the 2D barcode (e.g., a JPG image).

Ghosted account data 340 stores the ghosted names of payment accounts (e.g., credit/debit cards, etc.) available to use in a given payment transaction. As noted above, the ghosted names are not the actual account numbers (e.g., an actual credit card number) and nor are the actual account numbers recoverable from the ghosted names. Instead, each ghosted name provides an alias for an actual account, where the actual account numbers remain securely stored on the transaction server 120.

Figure 4:
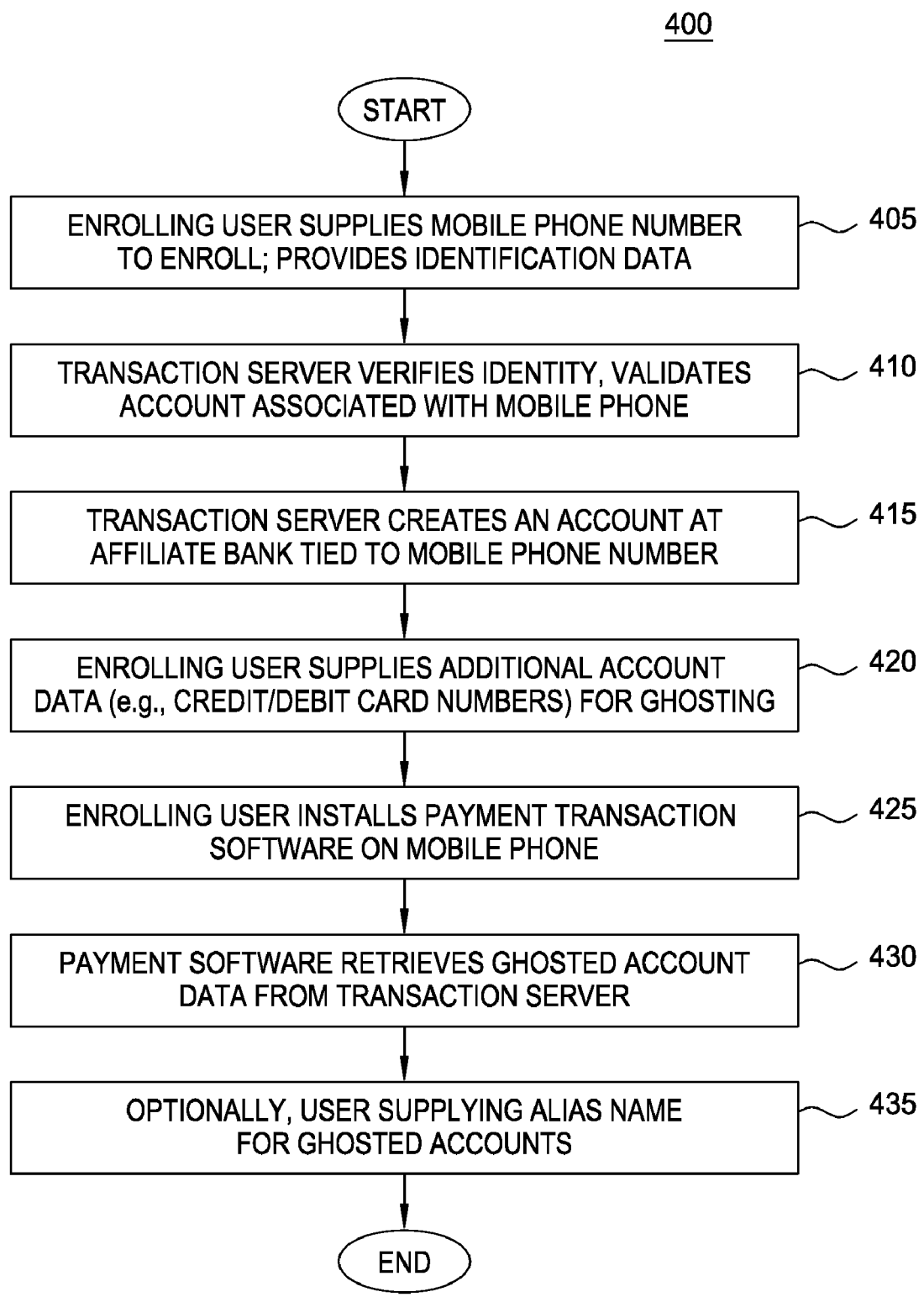
FIG. 4 is a flow diagram illustrating a method for enrolling a mobile telephone in a mobile telephone transaction system, according to one embodiment of the invention.

FIG. 4 is a flow diagram illustrating a method 400 for enrolling a mobile telephone in a mobile telephone transaction system, according to one embodiment of the invention. As shown, the method 400 begins at step 405 where an enrolling user supplies a mobile phone number to enroll in the mobile telephone transaction payment system 100. Additionally, the enrolling user may supply identification data (e.g., a driver's license number or passport number). For example, as described above, an enrolling user may interact with a kiosk to enter their name and phone number and to scan their driver's license. Alternatively, a user may interact with a web browser to provide the same information or with a clerk at a merchant participating in the enrollment process.

Once supplied the enrollment data is transmitted to the transaction server 120. Once received, at step 410, the transaction server 120 may be configured to verify information supplied by the enrolling user. For example, the transaction server 120 may communicate with third-party identification services. Similarly, the enrolling user may indicate a service provider from which they receive mobile phone services. The transaction server 120 may communicate with the service provider to verify that the phone being enrolled is associated with the phone number supplied by the enrolling user—as well as verify that the enrolling user has an account for that phone with the service provider. At step 415, the transaction communicates with the affiliate bank to establish an account to bind to the mobile telephone being enrolled. At step 420, the enrolling user may supply additional account data (e.g., credit/debit card numbers). As noted above, this information may be stored securely on the transaction server, and ghosted names may be transmitted to the mobile phone once the enrollment process is complete.

At step 425, the enrolling user installs a mobile phone payment application on their mobile phone. (e.g., the mobile phone application 330 of FIG. 3). Additionally, in one embodiment, the user may supply a pin, password, or generate encryption keys used to authorize a given payment transaction using the mobile phone as a payment device. Once installed, at step 430, the payment software may retrieve a list of ghosted accounts supplied during the enrollment process. For example, in one embodiment, the payment application installed on the mobile phone may retrieve the last four digits associated with each ghosted account. At step 435, the user may select to replace the default ghosted alias with another ghosted name.

Figure 5:
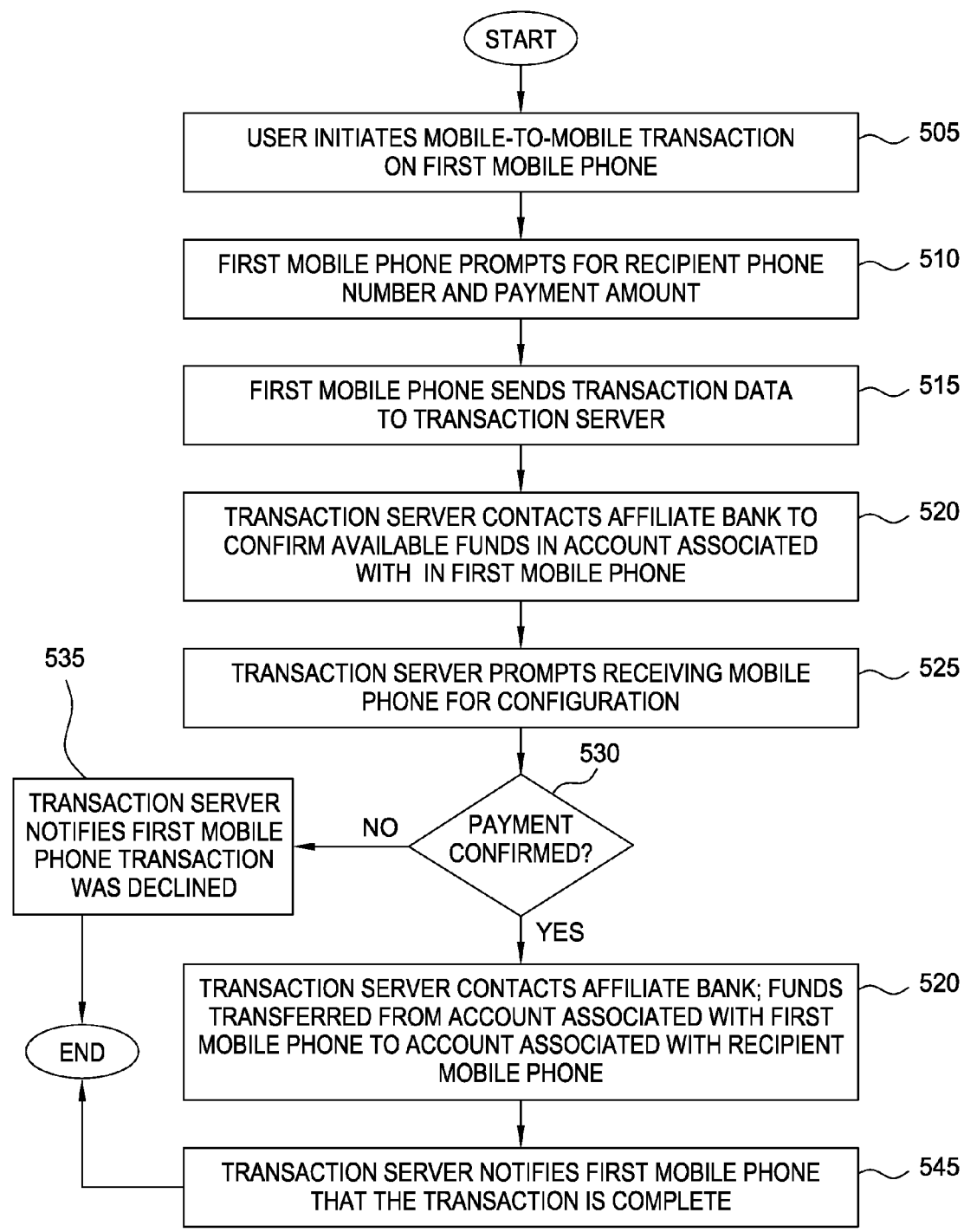
FIG. 5 is a flow diagram illustrating a method for a funds transfer between two enrolled mobile phones, according to one embodiment of the invention.

FIG. 5 is a flow diagram illustrating a method 500 for transferring funds between two enrolled mobile phones, according to one embodiment of the invention. Some aspects of the method 500 are described relative to the exemplary mobile phone interface screens shown in FIGS. 8A-8E.

As shown, the method 500 begins at step 505 where a user interacts with the mobile phone payment application installed on their mobile phone. For example, FIG. 8A illustrates an example graphical user interface display shown on an enrolled mobile phone. In this particular example, mobile phone 800 includes a touch sensitive display screen 805 showing a plurality of application icons, including icon 810. In this particular example, user clicks on the icon 810 to launch the payment application. Illustratively, mobile phone 800 includes navigation controls 815, including a track-ball used to move a display cursor in display area 805 to select and execute the payment application associated with icon 810. Of course, one of skill in the art will recognize that mobile phone devices may be configured using a variety of interface controls (e.g., buttons, touch-screens, etc.), which may be used to select and execute the payment application. Note, in one embodiment, a user may also have to supply a pin number or password to launch the payment application—or to invoke different payment transaction functions supported by the payment application.

An example of clicking on icon 810 is shown in FIG. 8B. Once launched, the display 805 shows a list 820 of options for initiating different payment transactions using mobile phone 800, as well as options for reviewing past transactions. Further, a current cash balance 812 of the account associated with the mobile phone 800 is also displayed on mobile phone 800 (i.e., the cash balance of the account with the affiliate bank). Referring again to method 500, at step 510, the first mobile phone prompts for a recipient phone number and payment amount. For example, one of the items in the list 820 is to "send cash (payment)." An example of the result of selecting this option is shown in FIG. 8C, where the user is prompted to select an existing payee (using a button 825) or a new payee (using a button 830). And an example of the result of selecting the "existing payee" button 825 is shown in FIG. 8D. Illustratively, the mobile phone display 805 now shows a list 835 of accounts. Each account in the list 835 includes a payee name and the mobile phone number associated with that possible recipient. Once the user selects one of the available payees, the phone may prompt the user to enter an amount to transfer to the selected recipient.

Referring again to the method 500, once the user supplies a payee and a payment amount, at step 515, the first mobile phone sends this information to the transaction server. At step 520, the transaction server contacts the affiliate bank to confirm that funds are available in the account associated with the first mobile phone. If not, the transaction server sends a message back to the first mobile phone, and the transaction is cancelled. Provided such funds are available, at step 525, the transaction server may send a prompt to the recipient mobile phone to confirm the payment account.

At step 530, the user of the recipient mobile phone may confirm the payment transaction using their mobile phone. At step 535, if the user of the recipient mobile phone declines to receive a transfer of funds from the first mobile phone, then the transaction server notifies the first mobile phone that the transaction was declined. Typically, however, it is expected that the recipient will approve the transfer of funds to their mobile phone. In such a case, at step 540, the transaction server contacts the affiliate bank, which transfers funds from the account associated with the first mobile phone to the account associated with the recipient mobile phone. At step 545, the transaction server notifies the first mobile phone that the transaction has been completed. The current cash balance 812 shown in display 805 of FIG. 8B may be reduced on the sending mobile phone and increased by a corresponding amount on the recipient mobile phone. Thus, the phone-to-phone transaction performed by method 500 operates to transfer funds from both accounts virtually instantaneously, and the amounts shown in the current cash balance 812 on each mobile phone reflect a true balance of the funds available in each account.

Note, in this example, the user of the first mobile phone selected a recipient with a mobile phone that has already been enrolled in the mobile telephone transaction payment system 100. Alternatively, the user may select the "new payee" button 830 shown in FIG. 8D. In such a case, the user may be prompted to enter the mobile phone number for another enrolled mobile phone. However, if the user enters a mobile phone number for a phone that has not been enrolled in the mobile telephone transaction payment system 100, then the transaction server may transmit a message requesting that the user of that phone enroll in the payment system 100, along with instructions for doing so.

Figure 6:
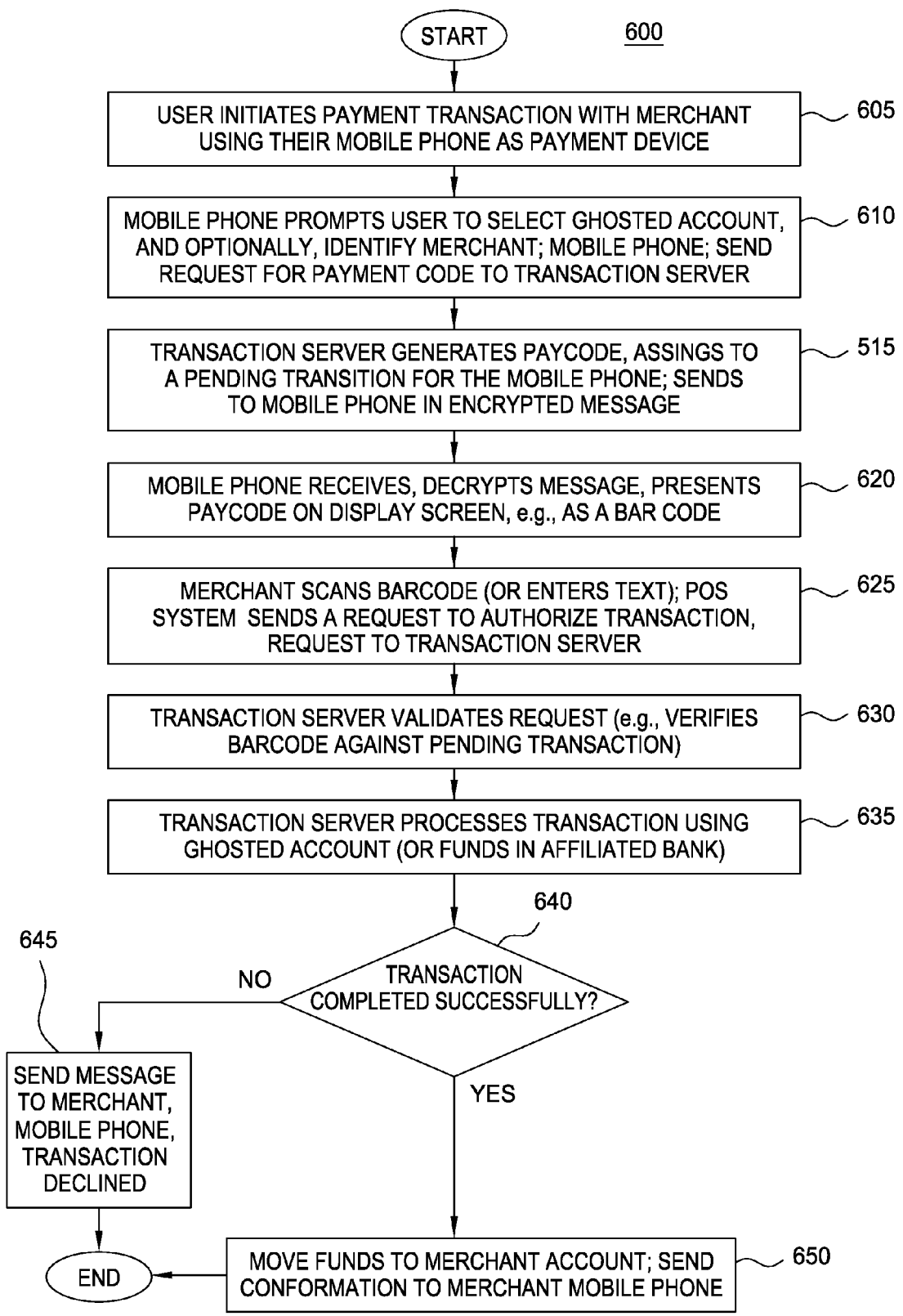
FIG. 6 is a flow diagram illustrating a method for a mobile phone to participate directly in a payment transaction, according to one embodiment of the invention.

FIG. 6 is a flow diagram illustrating a method 600 for a mobile phone to participate directly in a payment transaction with a merchant, according to one embodiment of the invention. As shown, the method 600 begins at step 605 where a user initiates a payment transaction with a participating merchant using their mobile phone as a payment device. For example, the list 820 of display 805 in FIG. 8B includes a choice to "make a purchase" button 814.

At step 610, the mobile phone prompts the user to select a payment source to fund the purchase transaction with the merchant. In one embodiment, the user may select the account tied to the mobile phone that was established during the enrollment process or the user may select a ghosted account. For example, FIG. 8E shows an example of the result of selecting the "make a purchase" button 814 shown in FIG. 8B. As shown in FIG. 8E, the mobile phone display 805 presents a list 840 of ghosted accounts. Each entry in the list shows an alias name of the ghosted account enrolled for that phone in the mobile telephone transaction payment system 100. Illustratively, the ghosted names in FIG. 8 include entries for a "personal Visa®" card" a "business AMEX®" card, and a "business checking" account. Importantly, as noted above, while the ghosted name of "business AMEX®" likely refers to an American Express® charge card, the actual account number for this card is not stored on the mobile phone 800.

At step 615, once the user selects a funding source for a purchase transaction, the selected source is transmitted to the transaction server. In response, the transaction server may generate a payment code and assign the code to a pending transaction for the requesting mobile phone. The payment code uniquely identifies the mobile phone participating in the transaction as well as the particular transaction. Once generated, the payment code may be stored in a list of pending transactions. Further the payment code may be transmitted to the mobile phone in an encrypted message. As noted above, in a particular embodiment, the payment code generated by the transaction server may be valid for a limited period of time and/or good for use only by a merchant identified in the request for the payment code.

At step 620, the mobile phone receives the message from the transaction server, decrypts it, and presents a payment code on the display screen. In one embodiment, the payment code may be an alphanumeric text string keyed into a point of sale system at the merchant. Alternatively, for an on-line merchant, the user of the mobile phone may enter the payment code in a text box in a e-commerce website of a participating online merchant. In another embodiment, the payment code may be a 2D barcode generated from the payment code and displayed on the mobile phone. In such a case, the user may present their mobile phone to the merchant to be scanned. For example, FIG. 8E.

For example, FIG. 8F shows a payment code being displayed in the display 805 of mobile phone 800. Illustratively, the display area 805 shows payment code data 845 indicating how long remains before the payment code expires. Additionally, display 805 shows both an alphanumeric pay code 850 and a 2D barcode 855—each of which provide a representation of the payment code generated by the transaction server.

Referring again to the method 600, at step 625, the merchant scans the 2D bar code 855 (or enters the alphanumeric pay code 850) to recover the payment code associated with the transaction initiated by the mobile phone. The merchant's point-of-sale (POS) system then sends a request to authorize the transaction initiated by the mobile phone user (and represented by the scanned barcode) for a specified amount. At step 630, the transaction server validates the request. For example, the transaction server may match the payment code received from the merchant with the list of payment codes generated for pending transactions. Once identified, the transaction server processes the transaction using the ghosted account specified by the user. For example, assume the user selected the ghosted account with the name "business AMEX®" as shown in FIG. 8E, and assume that this ghosted account does refer to an American Express charge account. In such a case, the transaction server retrieves the actual account number corresponding to the "business AMEX®" ghosted account and attempts to charge the amount specified by the merchant to that account. In such a case, the transaction server may have a merchant charge account with a credit card processing vendor.

Alternatively, the user may have selected to fund the transaction using the account established for the mobile phone during the enrollment process. In such a case, the transaction server communicates with the affiliate bank to verify that funds are available in the requested purchase amount, and if so, transfers funds from the mobile phone account to an associated with the merchant.

Referring again to the method 600, at step 640, if funds are not available in the mobile phone account (or if transaction is declined for the ghosted account, e.g., the American Express charge card is declined), then at step 645 a message is sent to the merchant and the mobile phone that the transaction was declined. Otherwise, at step 650, if the transaction is completed successfully, a message confirming transfer of funds or providing the appropriate authorization code from processing a ghosted account is sent to the merchant. Additionally, a message confirming the successful transaction may be sent to the mobile phone as well.

Figure 7:
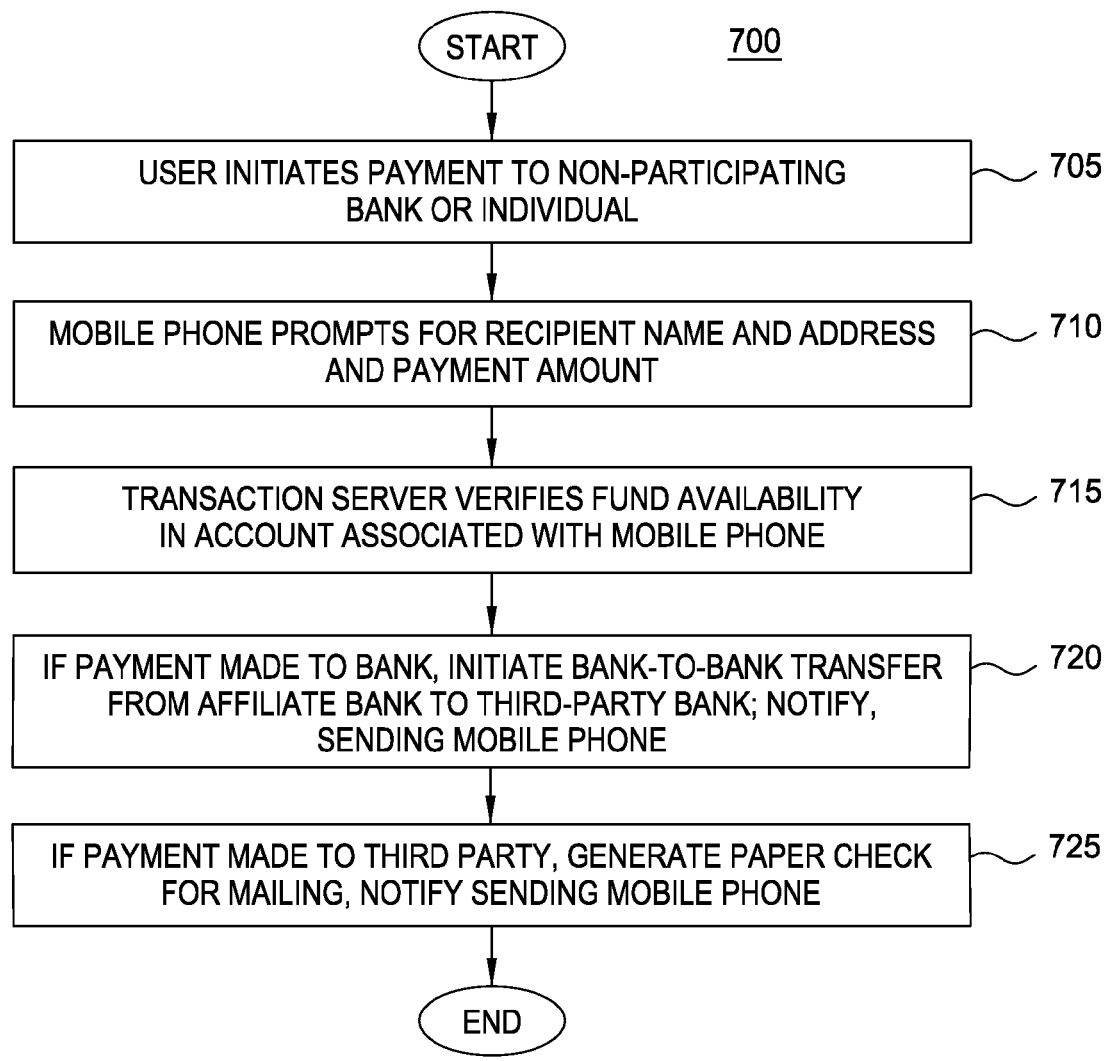
FIG. 7 is a flow diagram illustrating a method for a funds transfer between an enrolled mobile phone and a third-party bank or individual, according to one embodiment of the invention.

FIG. 7 is a flow diagram illustrating a method 700 for performing a funds transfer between an enrolled mobile phone and a third-party bank or individual, according to one embodiment of the invention. As shown, the method 700 begins at step 705 where a user initiates a payment to a third party bank or to a non-participating individual (i.e., an individual who has not enrolled a mobile phone in the mobile telephone transaction payment system 100). At step 710, the mobile phone prompts the user to provide a recipient name and payment amount. For example, to transfer funds to an individual, the user may specify a name, address, and payment amount. To transfer funds to a third-party bank, the user may specify a bank routing number and an account number. The payment application on the mobile phone then sends this information to the transaction server.

At step 715, the transaction server verifies that funds are available in the account established for the mobile phone during the enrollment process. Provided funds are available, if payment is requested to be made to a third-party bank, then at step 720, the transaction server sends a message to the affiliate bank to transfer the requested amount from the affiliate bank to the specified account at the third party bank. Once completed, the transaction server sends a confirmation message to the mobile phone that the transaction was completed.

At step 725, if the payment is requested to be made to a third party, then the transaction server sends a message requesting the affiliate bank generate a paper check made out in the requested amount naming the requested individual as payee. Once completed, the transaction server sends a confirmation message to the mobile phone that the transaction was completed.

Advantageously, as described herein, embodiments of the invention allow a mobile telephone, in conjunction with a payment transaction server, to be used directly as a payment device for a variety of financial transactions. Further, the transaction systems and methods for mobile telephone devices described herein allow a mobile telephone to participate in payment transactions in a manner that both prevent identify theft and does not rely on transferring amounts to/from one stored value account to another.

While the foregoing is directed to embodiments of the present invention, other and further embodiments of the invention may be devised without departing from the basic scope thereof, and the scope thereof is determined by the claims that follow.

What is claimed is:

1. A computer implemented method for using a mobile telephone as a payment device, comprising:
   receiving, by a transaction server, a request to enroll a mobile telephone in a payment transaction system, wherein the request includes an indication of an identity of an individual enrolling the mobile telephone and the telephone number of the mobile telephone;
   receiving, by a transaction server, one or more account numbers from the individual, wherein each account number corresponds to a payment account previously established by the individual;

generating, by a transaction server, a ghosted account name for each of the payment accounts; and transmitting, by a transaction server, each ghosted account name to a payment application executing on the mobile phone, wherein the payment application, when executed on the mobile telephone, allows the individual to initiate a payment transaction using the mobile telephone as the payment device in order to incur a charge on a selected one of the payment accounts without revealing the account number associated with the selected payment account;

wherein the transaction server is located behind a firewall in a bank network; and further comprising:

receiving, from the payment application on the mobile telephone, a request to initiate a payment transaction with a merchant;

receiving, from the payment application on the mobile telephone, an indication of one of the ghosted account names;

generating a payment code;

transmitting the payment code to the payment application on the mobile telephone;

receiving, from a point-of-sale system at the merchant, the payment code and a transaction amount;

identifying the payment account corresponding to the ghosted account name received from the payment application on the mobile phone;

initiating a charge to the identified payment account for the transaction amount;

and upon determining that the charge to the payment account has been approved, transmitting, to both the mobile telephone and the point of sale system, a confirmation that the payment transaction was completed successfully.

2. The method of claim 1, further comprising, establishing a bank account for the mobile telephone, wherein the bank account is tied to both the individual and the telephone number of the mobile telephone received with the request.

3. The computer-implemented method of claim 1, further comprising, verifying the identity of the individual enrolling the mobile telephone in the payment transaction system; and confirming that a service provider has a mobile telephone account for the mobile telephone associated for a subscriber which matches the identity of the individual.

4. The computer-implemented method of claim 1, wherein the payment application on the mobile telephone is configured to generate, from the payment code, a machine readable barcode scanned by the point-of-sale system at the merchant.

5. The computer-implemented method of claim 1, wherein the payment application on the mobile telephone is configured to generate, from the payment code, an alphanumeric string keyed into the point-of-sale system at the merchant.

6. The computer-implemented method of claim 1, wherein each of the payment accounts corresponds to one of a debit card account and a credit card account previously established by the individual.

7. A computer-readable storage medium containing a program, which, when executed on a processor performs an operation for using a mobile telephone as a payment device, the operation comprising:

receiving a request to enroll a mobile telephone in a payment transaction system, wherein the request includes an indication of an identity of an individual enrolling the mobile telephone and the telephone number of the mobile telephone;

receiving one or more account numbers from the individual, wherein each account number corresponds to a payment account previously established by the individual;

generating a ghosted account name for each of the payment accounts; and transmitting each ghosted account name to a payment application executing on the mobile phone, wherein the payment application, when executed on the mobile telephone, allows the individual to initiate a payment transaction using the mobile telephone as the payment device in order to incur a charge on a selected one of the payment accounts without revealing the account number associated with the selected payment account;

wherein the computer-readable storage medium is located behind a firewall in a bank network; and wherein the operation further comprises:

receiving, form the payment application on the mobile telephone, a request to initiate a payment transaction with a merchant;

receiving, from the payment application on the mobile telephone, an indication of one of the ghosted account names;

generating a payment code;

transmitting the payment code to the payment application on the mobile telephone;

receiving, from a point-of-sale system at the merchant, the payment code and a transaction amount; identifying the payment account corresponding to the ghosted account name received from the payment application on the mobile phone; initiating a charge to the identified payment account for the transaction amount; and upon determining that the charge to the payment account has been approved, transmitting, to both the mobile telephone and the point of sale system, a confirmation that the payment transaction was completed successfully.

8. The computer-readable storage medium of claim 7, wherein the operation further comprises, establishing a bank account for the mobile telephone, wherein the bank account is tied to both the individual and the telephone number of the mobile telephone received with the request.

9. The computer-readable storage medium of claim 7, wherein the operation further comprises: verifying the identity of the individual enrolling the mobile telephone in the payment transaction system; and confirming that a service provider has a mobile telephone account for the mobile telephone associated for a subscriber which matches the identity of the individual.

10. The computer-readable storage medium of claim 7, wherein the payment application on the mobile telephone is configured to generate, from the payment code, a machine readable barcode scanned by the point-of-sale system at the merchant.

11. The computer-readable storage medium of claim 7, wherein the payment application on the mobile telephone is configured to generate, from the payment code, an alphanumeric string keyed into the point-of-sale system at the merchant.

12. The computer-readable storage medium of claim 7, wherein each of the payment accounts corresponds to one of a debit card account and a credit card account previously established by the individual.

13. A system, comprising:
a processor; and a memory containing a transaction server, which when executed by the processor performs an operation for using a mobile telephone as a payment device, the operation comprising:

receiving a request to enroll a mobile telephone in a payment transaction system, wherein the request includes an indication of an identity of an individual enrolling the mobile telephone and the telephone number of the mobile telephone, receiving one or more account numbers from the individual, wherein each account number corresponds to a payment account previously established by the individual, generating a ghosted account name for each of the payment accounts, and transmitting each ghosted account name to a payment application executing on the mobile phone, wherein the payment application, when executed on the mobile telephone, allows the individual to initiate a payment transaction using the mobile telephone as the payment device in order to incur a charge on a selected one of the payment accounts without revealing the account number associated with the selected payment account;

wherein the system is located behind a firewall in a bank network; and wherein the operation further comprises:

receiving, form the payment application on the mobile telephone, a request to initiate a payment transaction with a merchant; receiving, from the payment application on the mobile telephone, an indication of one of the ghosted account names; generating a payment code;

transmitting the payment code to the payment application on the mobile telephone;

receiving, from a point-of sale system at the merchant, the payment code and a transaction amount;

identifying the payment account corresponding to the ghosted account name received from the payment application on the mobile phone;

initiating a charge to the identified payment account for the transaction amount;

and upon determining that the charge to the payment account has been approved, transmitting, to both the mobile telephone and the point of sale system, a confirmation that the payment transaction was completed successfully.

14. The system of claim 13, wherein the operation further comprises, establishing a bank account for the mobile telephone, wherein the bank account is tied to both the individual and the telephone number of the mobile telephone received with the request.

15. The system of claim 13, wherein the operation further comprises: verifying the identity of the individual enrolling the mobile telephone in the payment transaction system; and confirming that a service provider has a mobile telephone account for the mobile telephone associated for a subscriber which matches the identity of the individual.

16. The system of claim 13, wherein the payment application on the mobile telephone is configured to generate, from the payment code, a machine readable barcode scanned by the point-of-sale system at the merchant.

17. The system of claim 13, wherein the payment application on the mobile telephone is configured to generate, from the payment code, an alphanumeric string keyed into the point-of-sale system at the merchant.

18. The system of claim 13, wherein each of the payment accounts corresponds to one of a debit card account and a credit card account previously established by the individual.

* * * * *